United States Patent
Lai (10) Patent No.: US 7,437,356 B2
(45) Date of Patent: Oct. 14, 2008

(54) VISIBLE IMAGE DATABASE SYSTEM AND SEARCH METHOD USING THE SAME

(76) Inventor: Tsan-Yi Lai, 235 Chung-Ho Box 8-24, Taipei (TW)

( * ) Notice: Subject to any disclaimer, the term of this patent is extended or adjusted under 35 U.S.C. 154(b) by 283 days.

(21) Appl. No.: 11/195,546

(22) Filed: Aug. 3, 2005

(65) Prior Publication Data

US 2007/0033223 A1    Feb. 8, 2007

(51) Int. Cl.
*G06F 17/30* (2006.01)
(52) U.S. Cl. .......................................... 707/3
(58) Field of Classification Search ............... 707/1, 707/2, 104.1, 3, 10
See application file for complete search history.

(56) References Cited

OTHER PUBLICATIONS

Jeep.com.*
Wayback Machine.*

\* cited by examiner

*Primary Examiner*—Etienne P LeRoux (57) ABSTRACT

A visible image database system comprises a product database including product data about the drawings, specification, and manufacturing data of the product; a type database having the type drawings about the assembly units of the product; a class database having a plurality of class drawings capable of representing the product; the drawings of the assembly units on the class drawings are directed to a plurality of type drawings in the type database for selecting the types of the assembly units; and a guide database having a plurality of representative drawings each having specific meanings; the representative drawings being directed to the class database. Moreover a search method using a visible image database system is disclosed.

5 Claims, 10 Drawing Sheets

VISIBLE IMAGE DATABASE SYSTEM AND SEARCH METHOD USING THE SAME

FIELD OF THE INVENTION

The present invention relates to network search, and in particular to a visible image database system and search method using the same, wherein the searching objects are presented by drawings and users can search words without the limitation of words and language.

BACKGROUND OF THE INVENTION

In current search engines used in Internet, or other networks, the selections are performed by characters, namely, words or characters are used as keywords in searching, for example, in the network, such as Yahoo, Yam, Sina, etc. use search engines. However the words or characters are confined by necessary nations or areas or languages used. Thereby application of such kind of engines is limited. Furthermore, the current used translation software cannot have correct translation results. They are incorrect, even the users cannot understand what means of the translated words. Thus the prior art cannot satisfy the necessity of users due to limitation of using characters as searching tools.

SUMMARY OF THE INVENTION

Accordingly, the primary object of the present invention is to provide a visible image database system and search method using the same, wherein the searching objects are presented by drawings and users can search words without the limitation of words and language.

To achieve above objects, the present invention provides a visible image database system which comprises a product database including product data about the drawings, specification, and manufacturing data about the product; a type database having the type drawings about the assembly units of the product; a class database having a plurality of class drawings capable of representing the product; the drawings of the assembly units on the class drawings are directed to a plurality of type drawings in the type database for selecting the types of the assembly units; and a guide database having a plurality of representative drawings each having specific meanings; the representative drawings being directed to the class database. Moreover a search method using a visible image database system.

Moreover, the present invention provides a search method using a visible image database system. The method comprises the steps of selecting a representative drawing on a guide database; wherein the selected representative drawing being directed to a class drawing of a product and type drawings about a first assembly unit are displayed; selecting one of the type drawings related to the first assembly unit, so that the type drawings related to the first assembly unit being displayed on predetermined positions; selecting a second assembly unit so as to display type drawings related to the second assembly unit matched to the first assembly unit; selecting one of the type drawings related to the second assembly unit so that the type drawings related to the second assembly unit being displayed on predetermined positions matched to the type drawing of the first assembly unit; selecting a third assembly unit so as to display type drawings related to the third assembly unit matched to the first and second assembly units; selecting one of the type drawings related to the third assembly unit so that the type drawings related to the third assembly unit being displayed on predetermined positions matched to the type drawings of the first and second assembly units; selecting a fourth assembly unit so as to display type drawings related to the fourth assembly unit matched to the first, second and third assembly units; selecting one of the type drawings related to the fourth assembly unit so that the type drawings related to the fourth assembly unit being displayed on predetermined positions matched to the type drawings of the first, second and third assembly units; selecting a search drawing for searching a product formed by about first, second, third and fourth type drawings so as to display the product formed by the type drawings and related data of the product.

The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1:
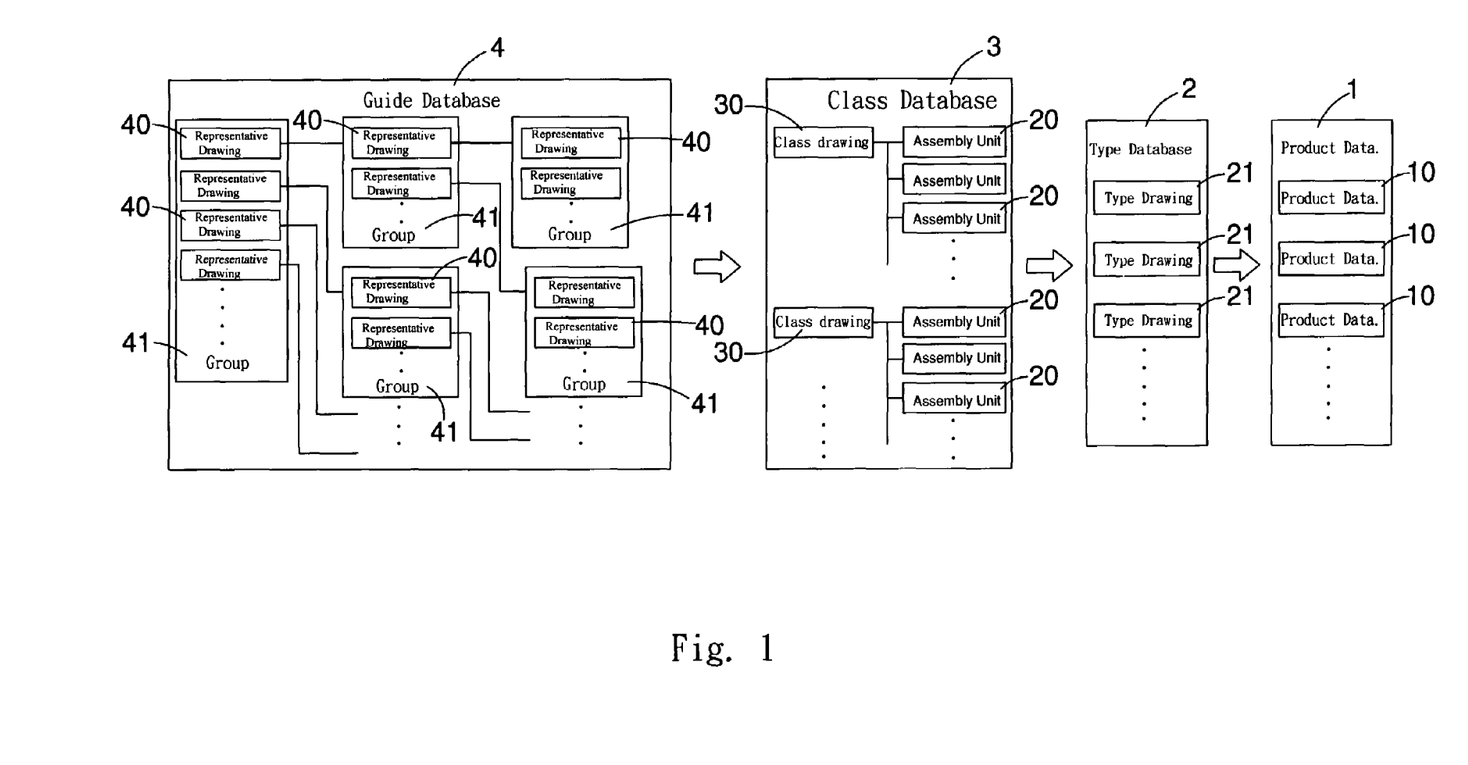
FIG. 1 is a system block diagram of the present invention.

With reference to FIG. 1, the structure of the present invention is illustrated. The present invention has the following elements.

A product database 1 includes product data 10 about the drawings, specification, and manufacturing data about the product.

A type database 2 has the type drawings about the assembly units 20 of the product.

A class database 3 has a plurality of class drawings 30 capable of representing the product. The drawings of the assembly units 20 on the class drawings are directed to a plurality of type drawings 21 in the type database 2 for selecting the types of the assembly units 20. Furthermore, by the selection of the assembly unit 20, it can be directed the product 10 data in the product database 1.

A guide database 4 has a plurality of representative drawings 40 each having specific meanings. The representative drawings 40 are divided into hierarchical groups 41. The groups 41 in different layers are communicated and connected to other group; and the last layer is directed to the class drawings 30 in the class database 3. For example, the groups 41 in the uppermost layer include drawings about eating, wearing, living, moving, amusement, and education. The groups 41 in the second layer includes various foods related to the eating guide, clothes about wearing, buildings about living, traffic tools about moving, amusement places about amusement; education fields and hospitals about education. The drawings of the group 41 at the lowest layer display the representative drawing of the product in the group 41. The representative drawing 40 is directed to the corresponding class drawing 30 in the class database 3.

Figure 2:
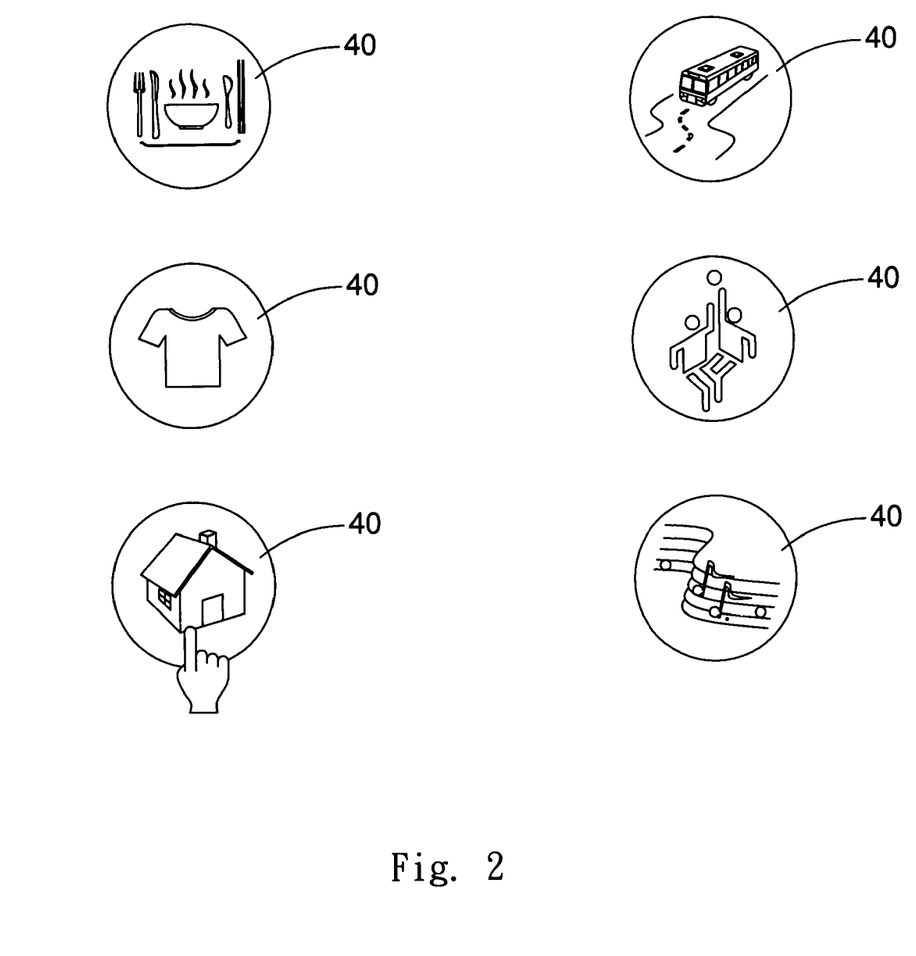
FIG. 2 shows the application of the present invention.
Figure 3:
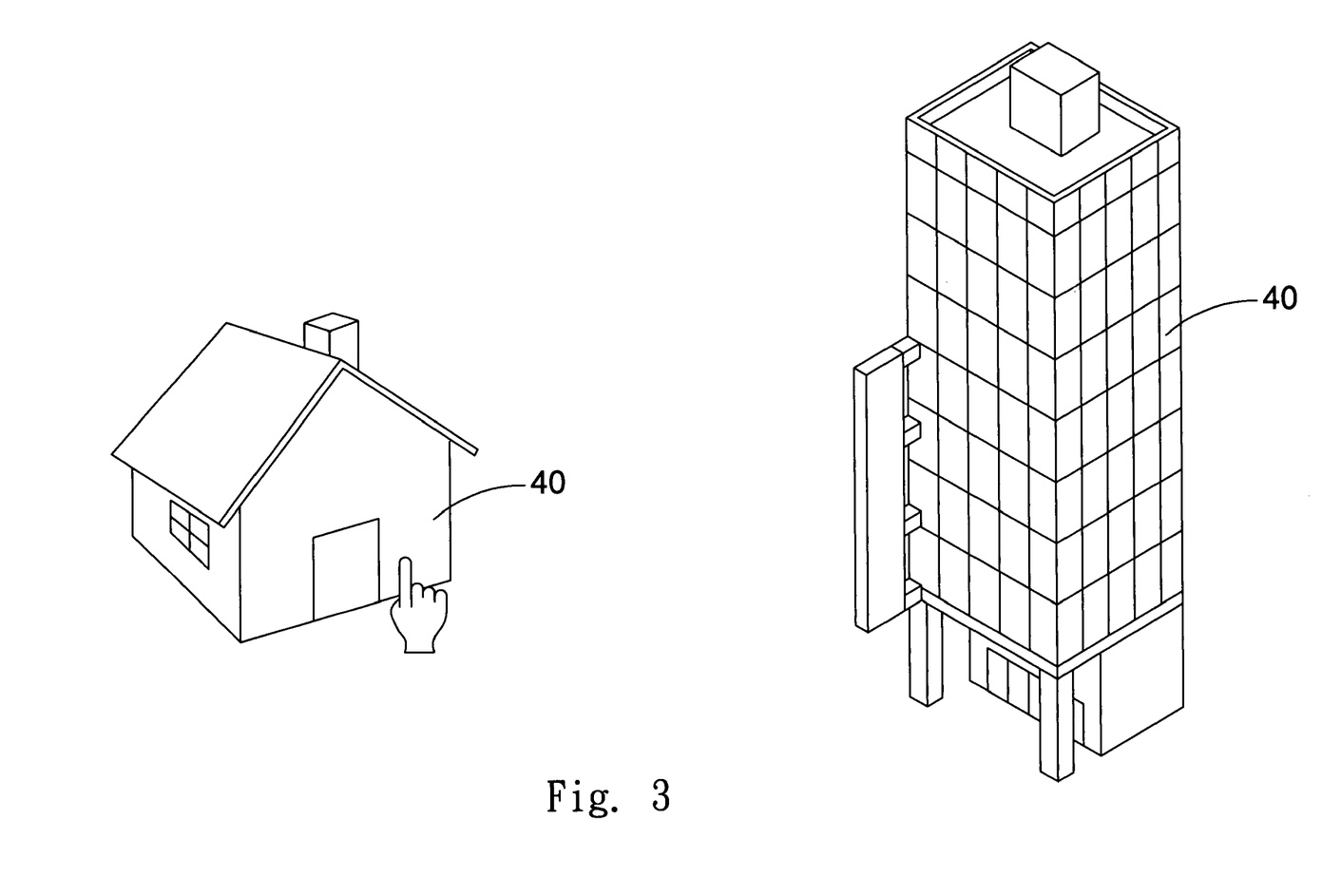
FIG. 3 shows a further application of the present invention.
Figure 4:
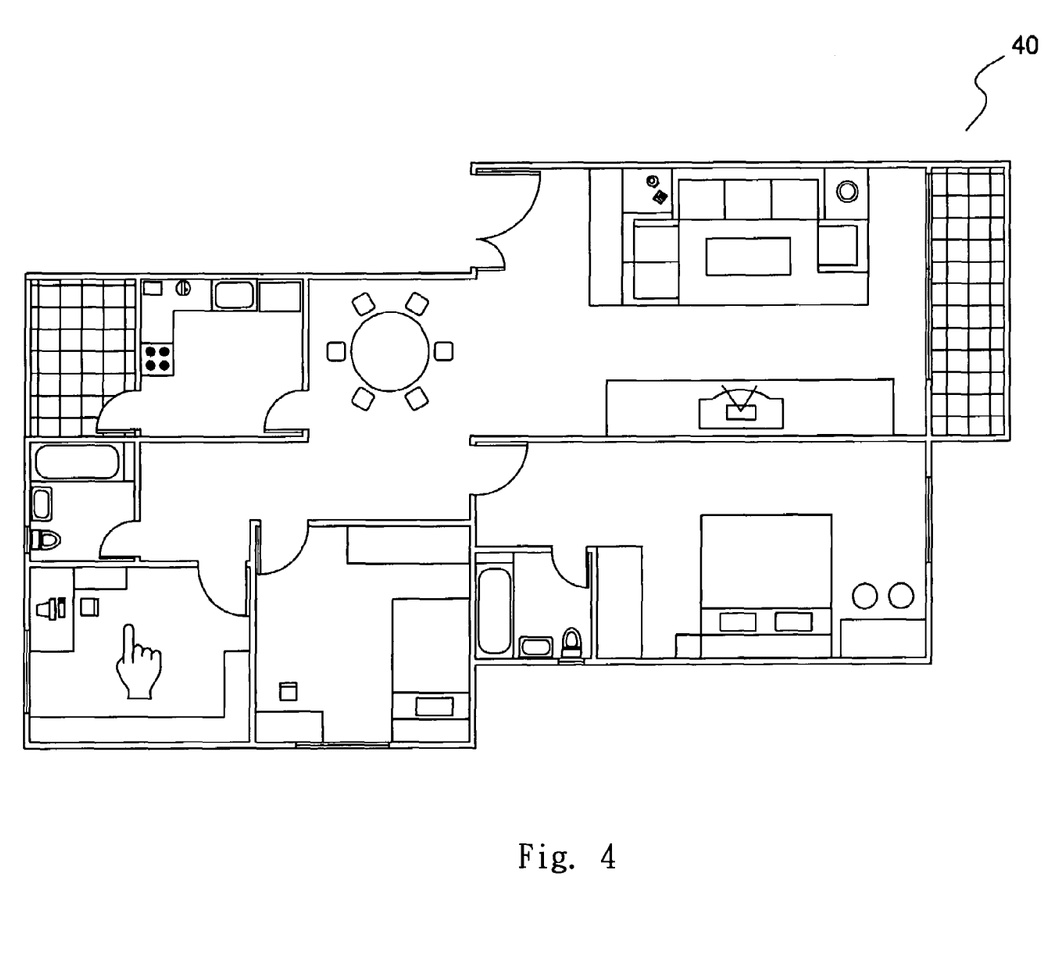
FIG. 4 shows a plane schematic view of the present invention.
Figure 5:
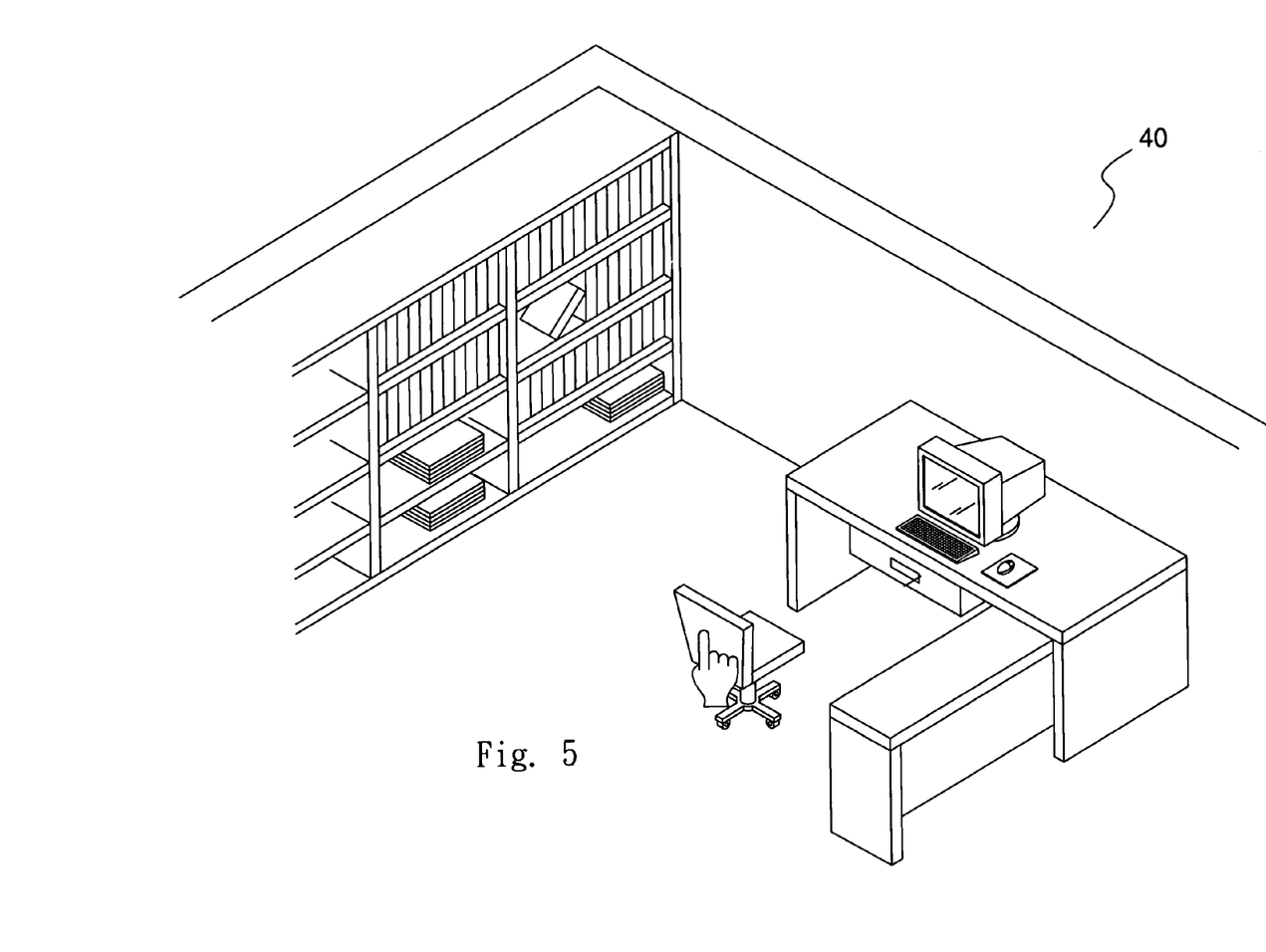
FIG. 5 is a schematic view about a study room according to the present invention.
Figure 6:
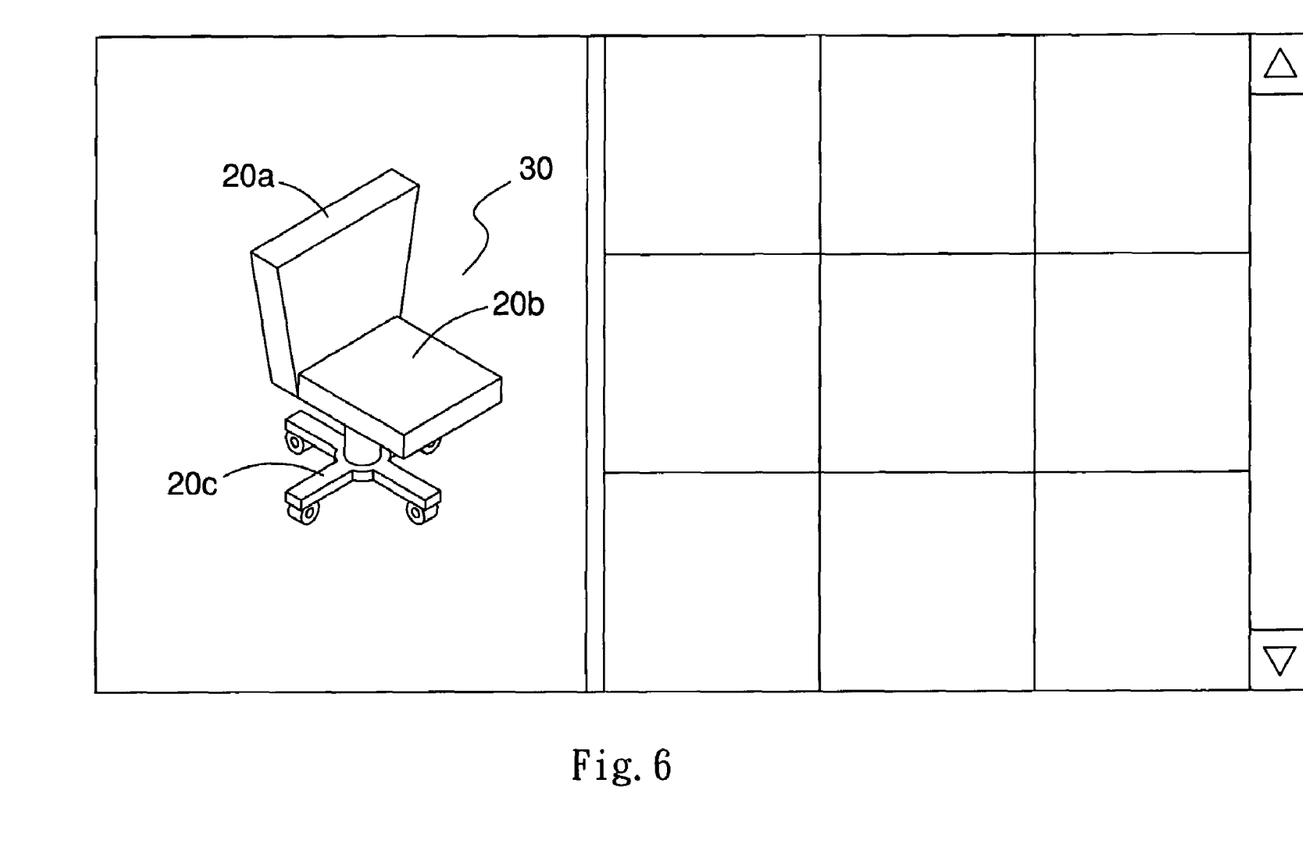
FIG. 6 is a schematic view showing the chairs and chair backs of the class drawings in the first embodiment of the present invention.
Figure 7:
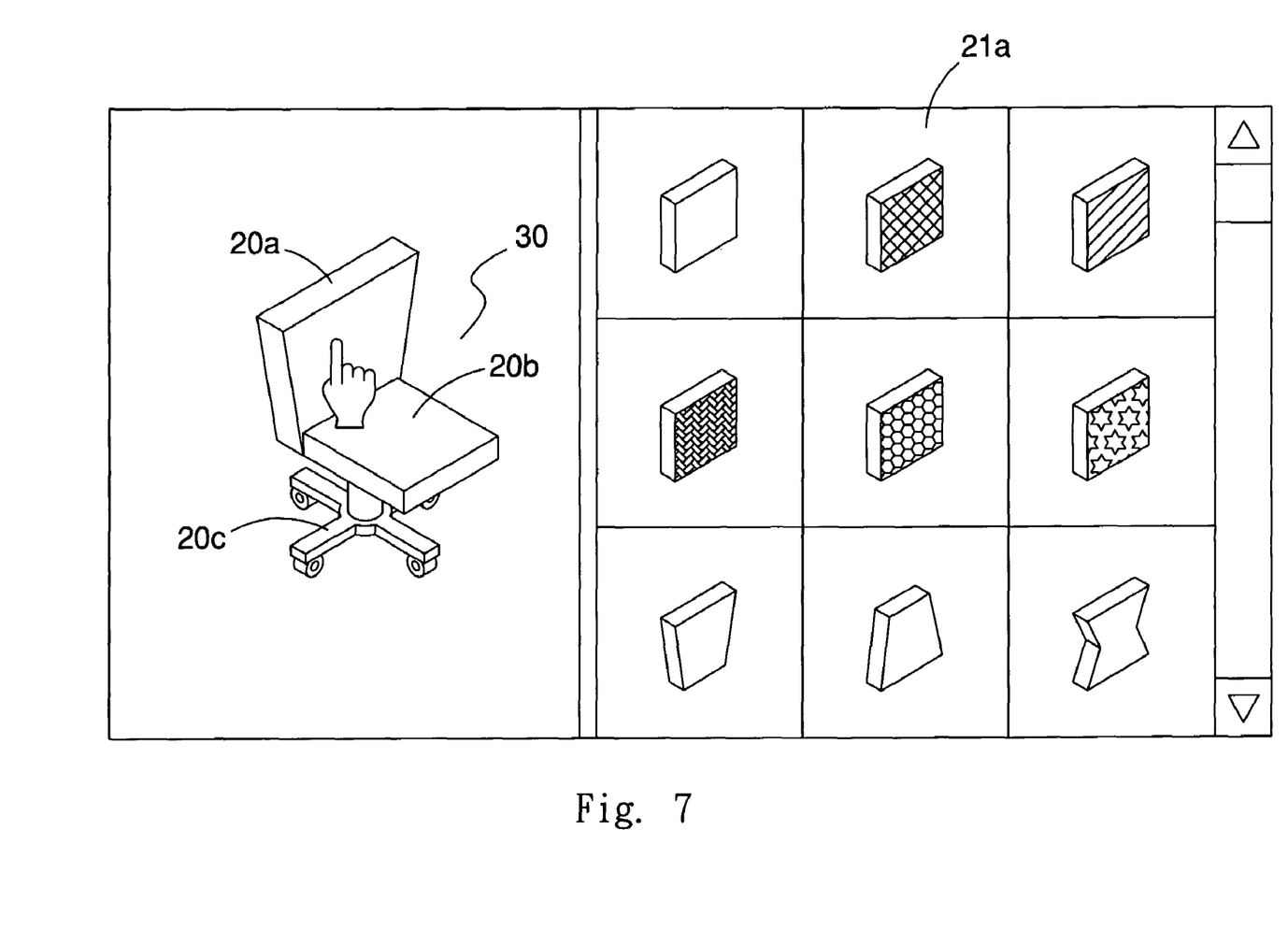
FIG. 7 shows the selection of the chair seat in the first embodiment of the present invention.
Figure 8:
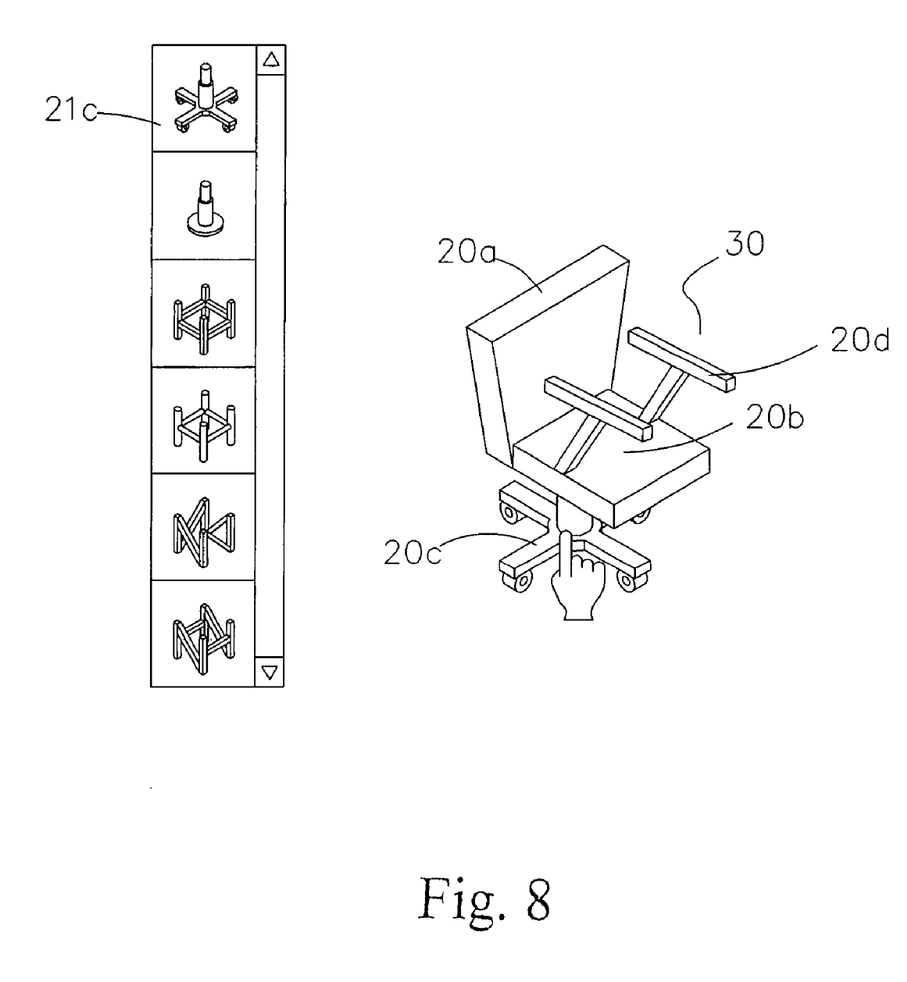
FIG. 8 shows the selection of the chair legs in the first embodiment of the present invention.
Figure 9:
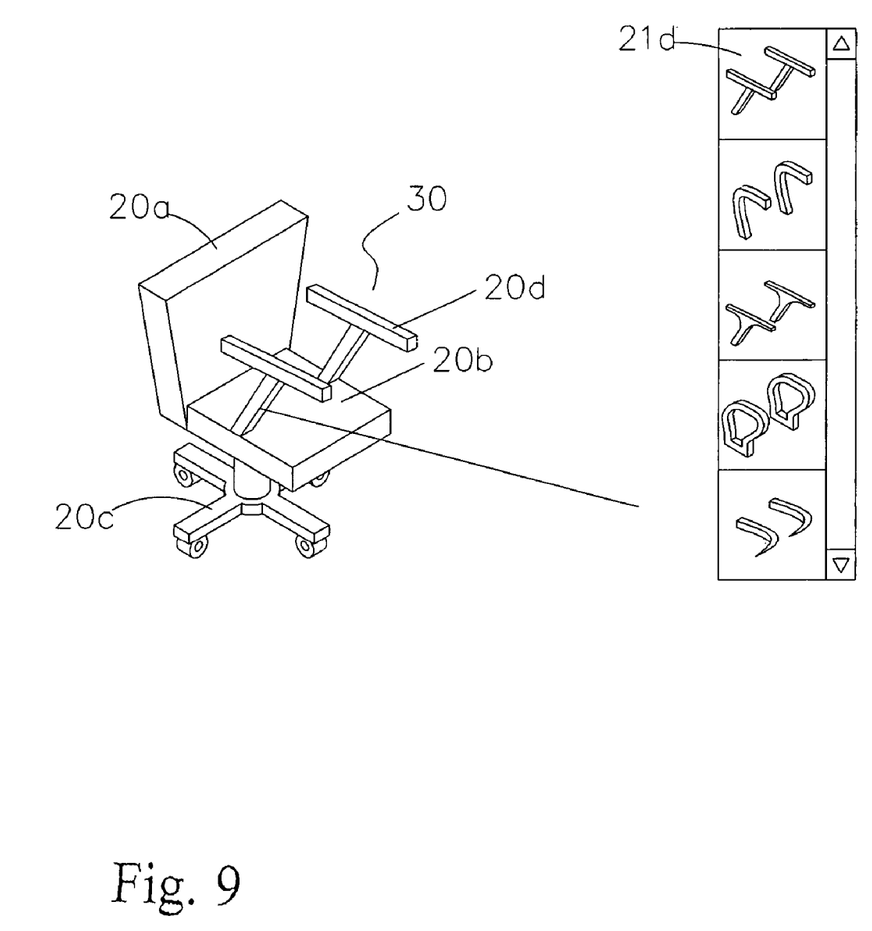
FIG. 9 shows the selection of the chair arms in the first embodiment of the present invention.

The searching method of the present invention will be described herein.

a) The related representative drawing 40 in the hierarchical layer structure is directed to the class drawing 30 of the product to the search. Referring to FIG. 2, when the "living" in the representative drawing 40 is selected from other items. Then the representative drawings 40 (FIG. 3) about house building and office building are appeared. Then the house building is selected, then the plane view showing a living room, a kitchen, main bedroom, a guest room, a bathroom, a study room, etc. are displayed as illustrated in FIG. 4. If the study room is selected, the internal structure of the study room is illustrated, such as a desk, a chair, a book frame, etc. are displayed (in FIG. 5). When the chair is selected, then classes of the chair (30) are displayed as illustrated in FIG. 6.

b) When the first unit 20*a* of the class drawing 30 is selected, then various type drawings 21*a* of the first assembly unit 20*a* are displayed. For example, referring to FIG. 6, when the chair back of the chair is selected, then a series of type drawings 21*a* about the chair back are shown for selection.

c) When one of the type drawings 21*a* is selected, the type drawings 21*a* are shown on predetermined positions. For example, when a desired trapezoidal marking is selected, the chair back will be replaced by a desired trapezoidal marking.

d) When the second assembly units 20*b* in the class drawings 30 are selected, the various type drawings 21*b* related to the second assembly unit 20*b* matched to the type drawings 21*a* of the first assembly unit 20*a* are illustrated. For example in FIG. 7, the chair seat is selected, all chair seats matched to the chair back 21*b* are shown.

e) When one of the type drawings 21*b* is selected, the type drawing 21*b* will be displayed to a position matched to the chair back of the type drawing 21*a*. For example, a light color textured chair seat is selected, the chair seat will be replaced by the light color textured chair seat.

f) When the third assembly units 20*c* on the class drawings 30 are selected, the products matched to the selected types from the first assembly units 20*a* and the second assembly units 20*b* are displayed. For example in FIG. 8, when the chair leg is selected, various type drawings 21*c* matched to the chair back and the light color texture chair seat are used.

g) When one of the type drawings 21*c* is selected, the selected third assembly unit 21*c* will display on a matched position matched to the type drawing 21*a* and type drawing 21*b*. For example, four-claw chair legs are selected, and then it will be placed as legs of the chair.

h) When the fourth assembly units 20*d* on the class drawings 30 is selected, the products matched to the selected types of the first assembly units 20*a*, the second assembly units 20*b* and the third assembly units 20*c* are displayed. For example in FIG. 9, when the chair arms are selected, various type drawings 21*d* matched to the four-claw chair legs, the chair back and the light color texture chair seat are displayed.

i) When one of the type drawings 21*d* is selected, the selected fourth assembly unit 21*d* will display on a matched position matched to the type drawing 20*a*, type drawing 20*b* and type drawing 20*c*. For example, plastic arms are selected, and then it will be placed at the arm portions of the chair.

j) Thereby according to above-mentioned way, the assembly units related to the type drawings 30 can be selected sequentially so as to form a product, such as above said chair back, seat, legs, arms, and then the whole drawing and specification of the chair and the data of the manufacturers are displayed. Furthermore, in the item i), various sizes of the product will be displayed, for example three cases are displayed.

j-1) In case of the product is shown at the proportion of one to one (i.e. The size of the product is shown at real dimension.). The chair can be seated, the computer can be normally worked and the airplane is a flying aviation.

j-2) In case of the product is shown at seven times scaledown. In this embodiment, the product is regarded as a decoration, which can be displayed singly or be placed within a glass frame so as to be placed in an exhibition. Thereby in this embodiment, the application of the chair, computer and plane are used as decorations or models.

j-3) In case of the product is shown at ten times scaledown. In this embodiment, the product is regarded as a small trinket, such that they can be placed to a key ring or a neck webbing. Thereby in this embodiment, the application of the chair, computer and plane are placed as small trinket for the garniture of the clothing or the bag.

Thereby all the items are displayed as drawings. Users can select desired items by drawings without using any characters.

Figure 10:
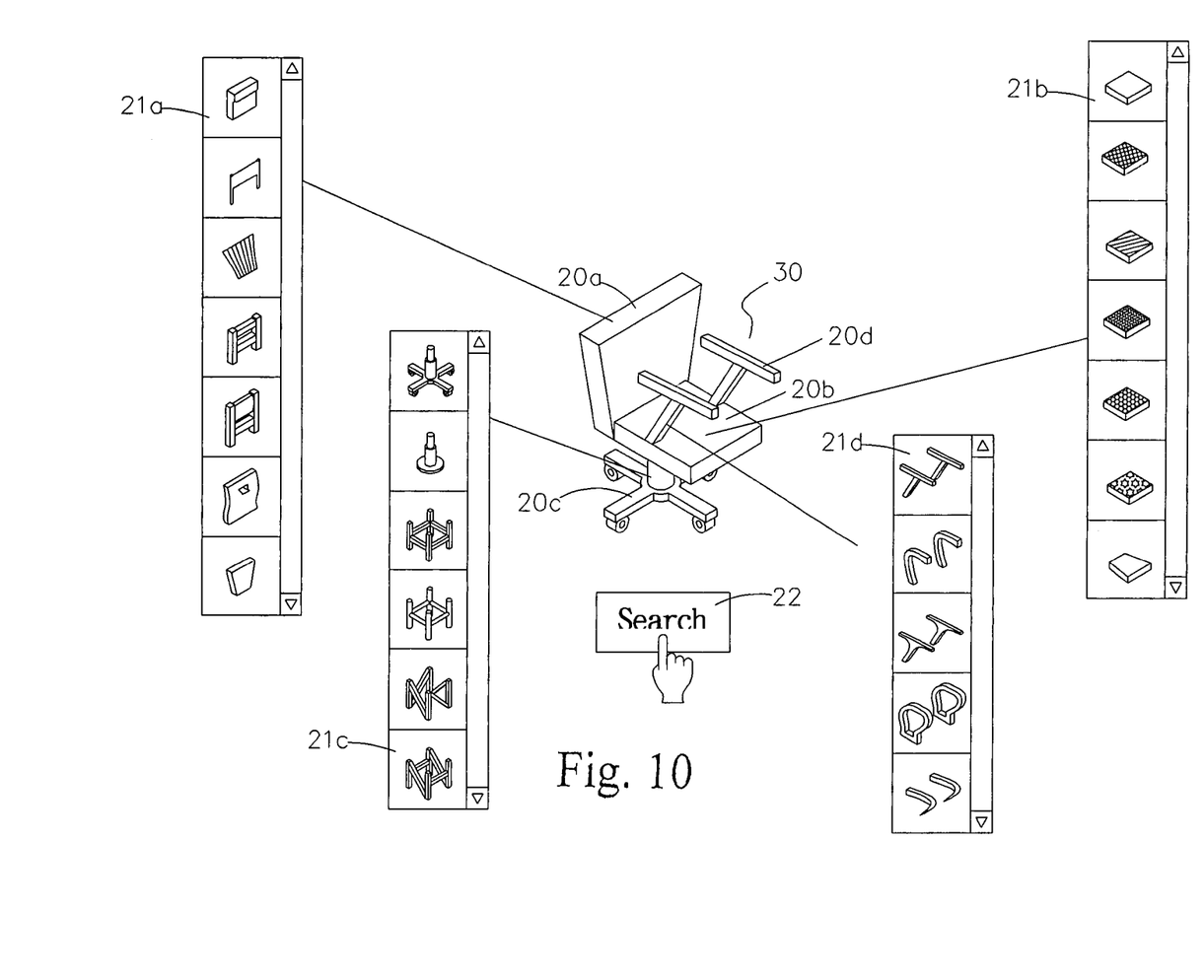
FIG. 10 shows the selection of the chair in the second embodiment of the present invention.

Referring to FIG. 10, a second embodiment about the searching method by using visible image database system is displayed. The step a) is identical to the step a) in above embodiment. In step b), when selecting the assembly units 20*a*, 20*b*, 20*c*, and 20*d* on the class drawings 30, all the type drawings 21*a*, 21*b*, 21*c*, and 21*d* are displayed. When the desired items are selected, a search drawing 22 is selected or the enter key in the keyboard is clicked. Then the selected items and the related data of the product are displayed.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A visible image database system comprising:
   a product database including product data about drawings, a specification, and manufacturing data of a product;
   a type database having type drawings about assembly units of the product;
   a class database having a plurality of class drawings capable of representing the product; drawings of the assembly units in the class drawings being directed to the type drawings in the type database for selecting types of the assembly units;
   a guide database having a plurality of representative drawings each having specific meanings; the representative drawings being directed to the class database;

wherein the representative drawings are divided into hierarchical groups with different layers; each layers having a part of the representative drawings; the groups in different layers are communicated and connected to other group; and the group in the last layer is directed to the class drawings in the class database; and wherein the groups in the uppermost layer includes drawings about eating, wearing, living, moving, amusement, and education.

2. The visible image database system as claimed in claim 1, wherein the groups in the second layer includes various foods related to the eating guide, clothes about wearing, buildings about living, traffic tools about moving, amusement places about amusement; education fields and hospitals related to education.

3. The visible image database system as claimed in claim 1, wherein the drawings of the group at the lowest layer display the representative drawing of the product in the group; the representative drawing is directed to the corresponding class drawing in the class database.

4. The visible image database system as claimed in claim 1, wherein the assembly units related to the class drawing are directed to type drawings for selecting and comparing types of the product.

5. The visible image database system as claimed in 1, wherein the assembly unit related to the class drawing are directed to type drawings; and the groups are formed by various types selected from the type drawings.

\* \* \* \* \*